United States Patent

Jasper et al.

Patent Number: 5,533,004
Date of Patent: Jul. 2, 1996

[54] METHOD FOR PROVIDING AND SELECTING AMONGST MULTIPLE DATA RATES IN A TIME DIVISION MULTIPLEXED SYSTEM

[75] Inventors: Steven C. Jasper, Hoffman Estates; Kenneth J. Crisler, Wheaton, both of Ill.

[73] Assignee: Motorola, Inc., Schaumburg, Ill.

[21] Appl. No.: 334,982

[22] Filed: Nov. 7, 1994

[51] Int. Cl.$^6$ .................................................. H04B 7/212
[52] U.S. Cl. ......................... 370/11; 370/84; 370/95.3; 375/265; 375/298
[58] Field of Search ........................... 370/11, 95.3, 84, 370/79; 375/261, 262, 265, 298, 341, 225; 371/43

[56] References Cited

U.S. PATENT DOCUMENTS

| | | | |
|---|---|---|---|
| 4,495,619 | 1/1985 | Acampora | 370/95.3 |
| 5,117,453 | 5/1992 | Piasecki et al. | 379/100 |
| 5,182,746 | 1/1993 | Hurlbut et al. | 370/100.1 |
| 5,197,061 | 3/1993 | Halbert-Lassalle et al. | 370/11 |
| 5,233,629 | 8/1993 | Paik et al. | 375/262 |
| 5,305,352 | 4/1994 | Calderbank et al. | 375/261 |
| 5,369,637 | 11/1994 | Richardson et al. | 370/84 |
| 5,377,194 | 12/1994 | Calderbank | 375/261 X |

*Primary Examiner*—Douglas W. Olms
*Assistant Examiner*—Min Jung
*Attorney, Agent, or Firm*—Christopher P. Moreno

[57] ABSTRACT

In a Radio Frequency (RF) communication system using Time Division Multiple Access (TDMA) having time slots of a common duration, a quantity of information bits to be transmitted is provided. Based at least in part on the number of information bits to be transmitted, a modulation technique is selected from a plurality of modulation techniques. Based at least in part on the modulation technique selected and the common duration of the time slots, the information bits are formatted into blocks, each block containing an equal number of information bits. The blocks are transmitted in the time slots such that a predetermined symbol rate is maintained.

23 Claims, 3 Drawing Sheets

FIG. 4
| FORMAT NUMBER | CODE RATE (R) | MODULATION RATE (K) | INTERLEAVE SIZE (BLOCKS/SLOT) | EFFECTIVE DATA RATE(BITS/SYMBOL) |
|---|---|---|---|---|
| 0 | 1/2 | 2 (QPSK) | 1 | 1:1 |
| 1 | 1/2 | 4 (16QAM) | 2 | 2:1 |
| 2 | 2/3 | 6 (64QAM) | 4 | 4:1 |
| 3 | 3/4 | 8 (256QAM) | 6 | 6:1 |
FIG. 5
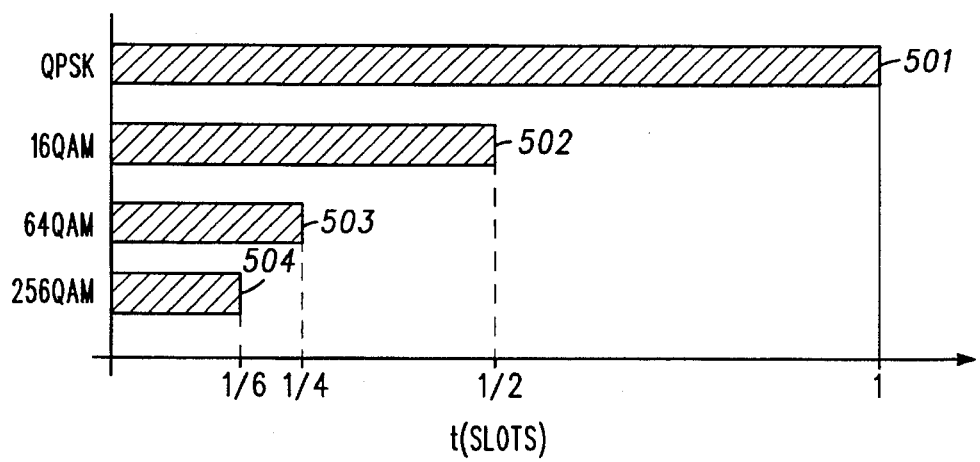
FIG. 6
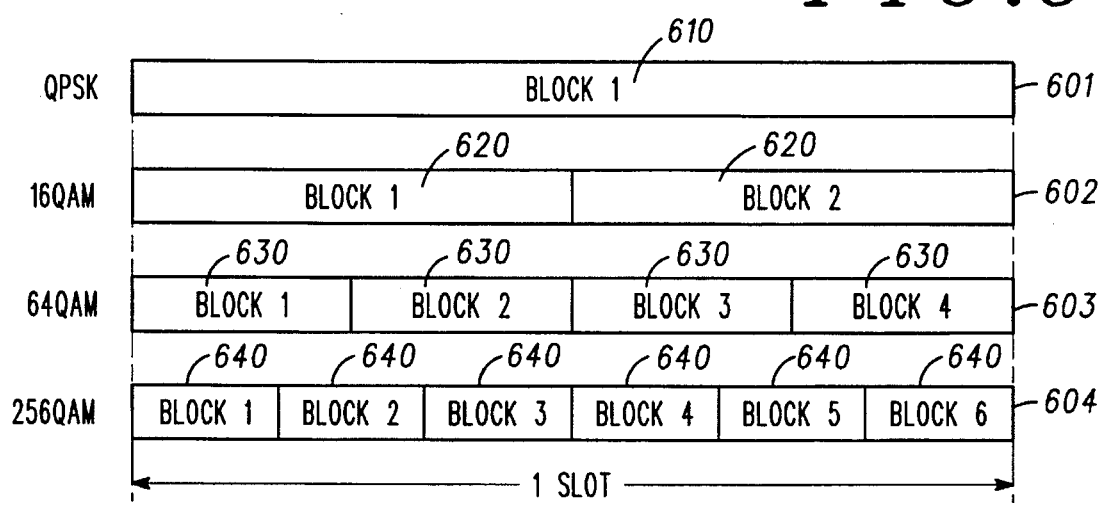

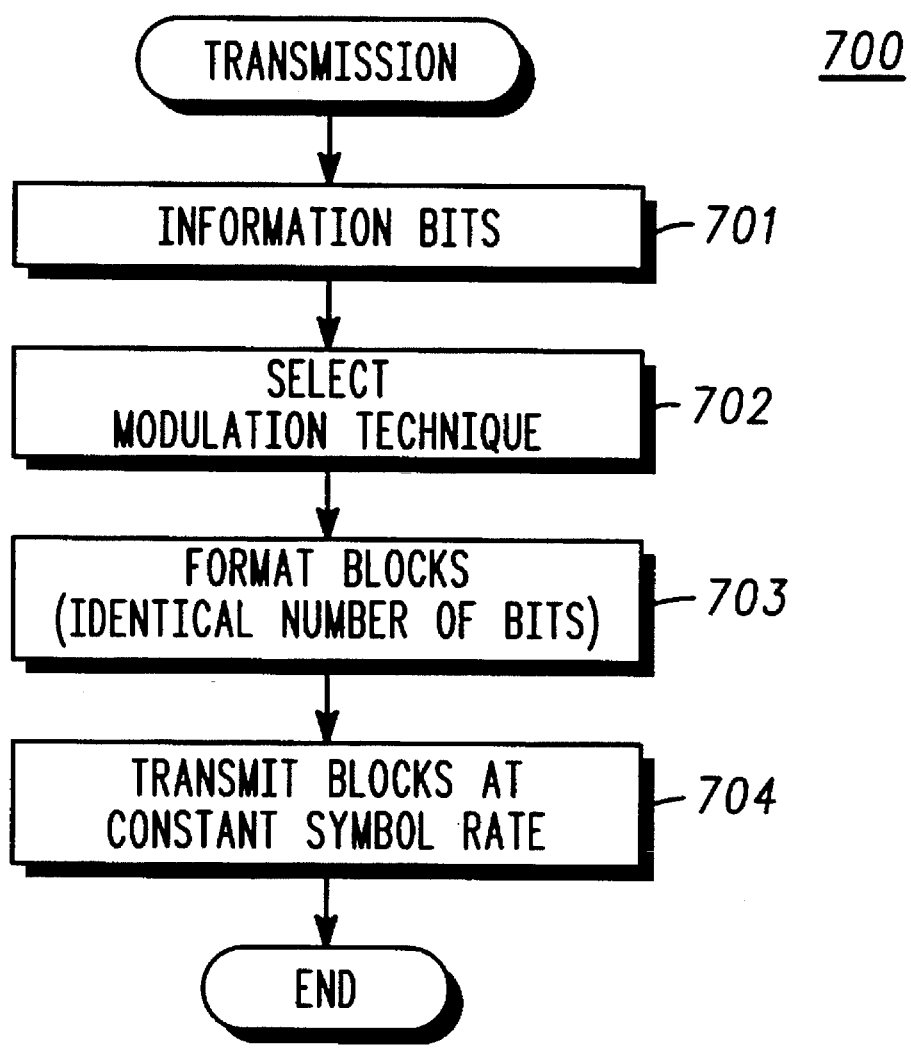

METHOD FOR PROVIDING AND SELECTING AMONGST MULTIPLE DATA RATES IN A TIME DIVISION MULTIPLEXED SYSTEM

FIELD OF THE INVENTION

This invention relates generally to data communication systems

BACKGROUND OF THE INVENTION

Radio frequency (RF) communication systems for the transmission of data information (i.e. binary coded information) are well-known in the art. RF data communication systems generally provide a single channel data rate to their users. In these systems, the modulation and error coding are designed to provide acceptable performance for users at the edge of the desired coverage area, where generally worst case signal quality conditions are experienced.

It is well-known that, at signal quality levels typical of those found in closer proximity to a transmitting antenna (rather than at the edge of a radio coverage area), higher data rates with corresponding higher data throughputs are possible. It is also well-known that a relatively wide dynamic range of signal quality levels (e.g. 20–80 dB or decibels) typically exists within the coverage area of a mobile radio communication system. Therefore, users of prior art data communication systems who experience signal quality levels significantly above those found near the fringe of the coverage area generally suffer a lower grade of performance, in terms of data throughput, than would otherwise be possible.

In the field of wireline telecommunications, data modems that provide multiple data rates in response to signal quality levels are well-known. The methods used in this art, however, are not well-suited for application to radio data systems in general, and particularly to radio systems employing Time Division Multiple Access (TDMA). In TDMA systems, the radio channel is divided into a series of time slots of predetermined constant duration, which are typically further grouped into frames, each frame containing a predetermined number of time slots. Multiple users are allowed to access the radio communication channel by transmitting in one or more time slots in each frame. Thus a complete communication is composed of a series of multiple transmissions, such that the duration of each transmission is equal to the time slot duration.

Radio data communication methods typically transmit data in variable length messages referred to as packets. Packets are formed by dividing the data into a series of fixed-size protocol units referred to as blocks. The combination of the data block size, the data transmission rate, and the TDMA slot size determines how effectively the TDMA channel can be used. For example, if an integer number of blocks would not fit evenly into each time slot, the capacity representing the fractional block may go unused, reducing the available throughput of the channel. Alternately, a synchronization method could be implemented to permit all of the data capacity to be utilized, but such techniques are often complex. This additional complexity manifests itself in increased cost and in additional communication overhead that also reduces available throughput.

Assuming a predetermined time slot duration, it is possible to choose a block size that avoids these problems for a single transmission data rate. A problem arises, however, when seeking to provide a channel that will support multiple data rates.

Accordingly, a need arises for providing a plurality of data rates for use with an RF data system so that users may select that data rate that provides the best performance for their signal quality level. It is further desired that the multiple data rates be provided in a manner such that a TDMA communication channel can be utilized efficiently by a packet data protocol.

BRIEF DESCRIPTION OF THE DRAWINGS

FIG. 4 is a table illustrating combinations of modulation rates and code rates in accordance with the present invention.

FIG. 5 is a diagram illustrating the duration of data blocks using multiple data rates in accordance with the preferred embodiment.

FIG. 6 is a diagram illustrating the format of TDMA time slots using multiple data rates in accordance with the preferred embodiment.

FIG. 7 is a flow chart illustrating the method of the preferred embodiment.

DETAILED DESCRIPTION

The following paragraphs describe in detail a method for maximizing data communication system throughput in a fashion that avoids the shortcomings revealed in the foregoing discussion of the background art. The method described combines multiple Forward Error Correction (FEC) procedures with multiple modulation constellations, resulting in multiple data rates optimized for a given signal quality measure to provide maximum data throughput for signal conditions.

In a preferred embodiment, the method may be applied to a Radio Frequency (RF) communication system using TDMA (Time Division Multiple Access) to integrate multiple services, such as voice and packet data, within the same RF communication channel. Of course, the principles described herein are equally applicable to many other types of communication systems as well.

Figure 1:
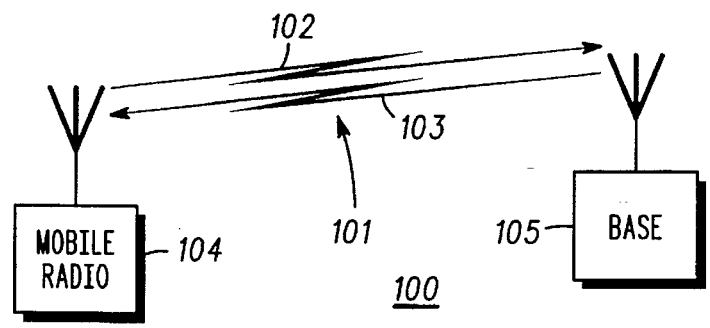
FIG. 1 is a block diagram of a Radio Frequency communication system in accordance with the present invention.

Referring to FIG. 1, the RF communication system (100) of the preferred embodiment makes use of one or more RF communication channels (101) to provide a variety of communication services, among them voice and data (i.e. binary coded information) communications. Each RF communication channel (101) in fact is comprised of two RF frequencies (102, 103), about which the radio signals are modulated. One of the RF frequencies is referred to as the inbound frequency (102) and is used for the transmission of information from mobile radio devices (mobile units) (104) to base radio devices (base units) (105). The second of the RF frequencies is referred to as the outbound frequency (103) and is used for the transmission of information from base units (105) to mobile units (104). Frequency assignments are typically made in a manner such that there is a constant spacing or offset between the inbound and outbound frequency of a communication channel. Further, in the preferred embodiment, the offset between adjacent communication channels (i.e. between adjacent inbound frequencies or adjacent outbound frequencies) is 25 kHz.

Figure 2:
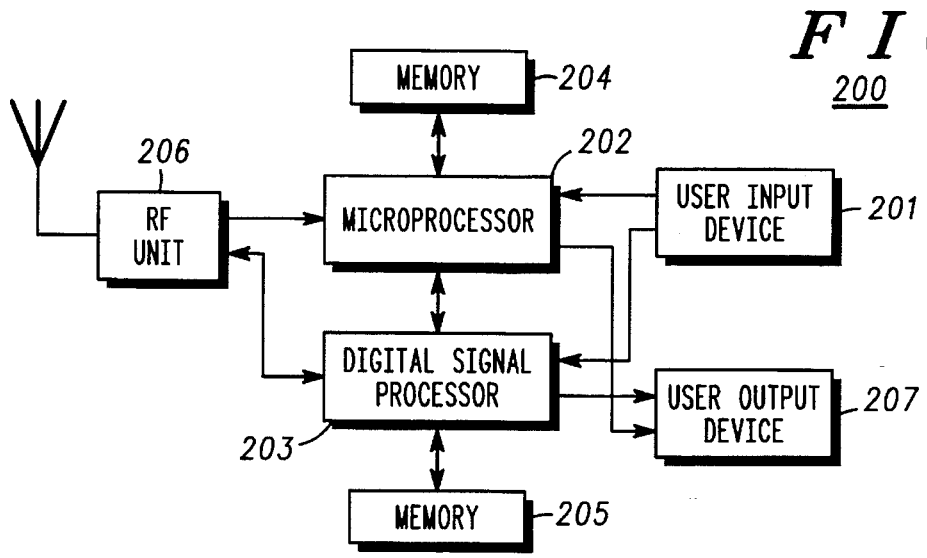
FIG. 2 is a block diagram of a radio device that may be used to implement the present invention.

The configuration of radio units (104, 105) in accordance with the preferred embodiment is illustrated in the block diagram of FIG. 2. Information to be transmitted is provided by a user input device (201). The user input device may be a keyboard in the case of a mobile unit (104) or a network or computer interface in the case of a base unit (105). Information supplied by the user input device (201) is applied to a microprocessor (202) and a digital signal processor (203). The microprocessor (202) and the digital signal processor (203) work in concert to encode and format the information for transmission. The encoding and formatting operations are generally executed via algorithms which are typically implemented with sequences of software commands stored in the memory devices provided (204, 205). The memory devices (204, 205) will also typically contain read/write memory used to store the information during processing., After the information is encoded and formatted, it is passed by the digital signal processor (203) to the RF unit (206) for transmission on the RF channel (101). The microprocessor (202) acts to control features of the RF unit (e.g. timing) to ensure that the information transmission is compatible with the requirement of the RF channel (101).

RF signals received by the RF unit (206) are applied to the digital signal processor (203) for demodulation and decoding. As in the transmit case, the microprocessor (202) acts to control the RF unit (206) and the digital signal processor (203) in accordance with predetermined reception algorithms. After the received information is decoded, the information is presented to the user output device (207). The user output device (207) may be a data terminal display in the case of a mobile unit (104) or a network or computer interface in the case of a base unit (105). Thus the radio unit (200) depicted in FIG. 2 acts to transmit and receive information between user devices and the RF channel (101).

Each of the inbound and outbound frequencies (102, 103) comprising the RF channel (101) are divided in .time into a continuous series of time slots of equal or common duration. In the preferred embodiment, the common duration of each time slot is 15 ms. Using a multiple access method well-known in the art as Time Division Mutliple Access (TDMA), information is transmitted in the communication channel in bursts equal to the size of the time slots. In the preferred embodiment, the bursts are modulated onto the RF frequency using a Quadrature Amplitude Modulation (QAM) technique. QAM techniques are well-known by those skilled in the art as a means of modulating information organized into two-dimensional or complex symbols. Complex symbols are comprised of two scalar values, an in-phase value and a quadrature-phase value. These values are typically taken from a discrete set of values, with each value representing a binary coded number. For example, a 2 bit (binary digit) number would be represented by one of four possible values. The set of values represented by the complex symbols is referred to as a QAM constellation. The number of distinct values represented by a single symbol (the number of in-phase values times the number of quadrature-phase values) is typically used to describe the order or size of a QAM constellation. Thus, a QAM technique using 4 discrete values for each component is referred to as 16 QAM.

The QAM technique of the preferred embodiment is used to transmit symbols at a constant symbol rate. Hence, given the common duration of the time slots, a common number of symbols may be transmitted in each time slot. Some number of the symbols in each time slot are used for synchronization and other purposes not directly involved in the transfer of user information. The number of symbols remaining, 168 in the preferred embodiment, are used to communicate user information. The group of 168 symbols is referred to as a Normal Transmission Unit (NTU).

In the discussion that follows, the application of the present invention to the communication of packet data is described. Those of reasonable skill in the art should recognize how the concepts disclosed herein could be applied to other forms of communication. Radio data communication methods typically transmit data in variable length messages referred to as packets. Packets are formed by dividing the data into a series of fixed-size protocol units referred to as blocks. The first block of a packet is typically referred to as the header block and contains addressing and other data communication control information. Subsequent blocks typically contain the user data to be communicated by the communication system. In addition to the user data or header information, each block is also configured with error detection coding, e.g. a Cyclic Redundancy Check (CRC) code, to permit the receiving unit to determine if errors occurred due to fading, noise, or interference during the transmission of the block. In the preferred embodiment, each block, including user data and CRC coding, is comprised of 165 bits of information.

The Forward Error Correction (FEC) coding and formatting procedure used to transmit the data blocks will be described in conjunction with the block diagram shown in FIG. 3. The transmit procedure is described here; the receive process is a straightforward reversal of the transmit process. In the preferred embodiment, these processes would be implemented in the digital signal processor (203) depicted in FIG. 2.

User data is first parsed into blocks as described earlier (not shown in FIG. 3). Blocks (301), each 165 bits long, are first encoded using a trellis encoder (304). Conceptually, the trellis encoder (304) may be viewed as the combination of a convolutional encoder (302) and a bit-to-symbol mapper (303), where the designs of the coder and mapper have been jointly optimized to achieve desirable performance under a predetermined range of signal quality. The convolutional encoder (302) operates to encode the input data using a shift register memory element at an encoding rate R, where R is the ratio of input bits to output bits and is generally less than one. For example, a coder of rate ½ will produce 2 output bits for every input bit. The convolutional coder may also append additional input bits, referred to as flush bits, to the end of the input block which are used to return the encoder shift register memory to a known state following encoding. In the preferred embodiment, 3 flush bits are appended by the convolutional encoder (302). Thus, the convolutional encoder (302) produces an output encoded block (305) of length 168/R bits. The encoded block (305) is fed into a bit-to-symbol mapper (303) that takes groups of encoded bits and produces complex symbols. This operation also has a characteristic rate, the number of bits grouped into each symbol K. Together, the coding and symbol mapping steps form a trellis encoder (304) with coding rate R and constellation size $2^K$.

The output of the trellis encoder (304) is a symbol block (306) containing 168/KR complex symbols. This symbol block is inserted into a symbol block buffer (307) of length KR blocks. After KR symbol blocks are collected in the buffer, a symbol block interleaver (308) combines the blocks to form a single NTU (309) of 168 symbols. This NTU (309) is output to a RF modulation process for transmission according to principles well-known in the art.

It should be clear from the preceding discussion that the parameters K and R can be adjusted to control the number (K*R) of blocks (301) assembled per NTU (309), allowing variable user data rates to be supported while constraining K*R to be an integer. Four combinations which satisfy these criteria are summarized in FIG. 4. For example, consider the first combination in FIG. 4. Here a rate ½ code is used so that the convolutional encoder (302) would produce 336 output bits from the 165 input bits of each block (301). In this case, a 4 QAM (also known as Quadrature Phase Shift Keyed (QPSK)) constellation is used which groups 2 bits into each symbol. Thus, 168 symbols are produced from each block (301). Hence, one such encoded block can be placed in a single NTU. Thus the effective information bit to transmitted symbol ratio is 1:1.

Now consider the second combination in FIG. 4. Here a rate ½ code is also used. However, in this case, a 16 QAM constellation is used which groups 4 bits into each symbol. Thus, 84 symbols are produced from each block (301). Hence, 2 such encoded blocks Can be placed in a single NTU comprised of 168 symbols producing an effective information bit to transmitted symbol ratio of 2:1. Note that since the NTU in either case occupies a single channel time slot, the effective data rate of the second combination is twice that of the first. Similarly, the third and fourth combinations in FIG. 4 illustrate other code rate and QAM constellations that are utilized to produce effective information bit to transmitted symbol ratios of 4:1 and 6:1, respectively, so that data rates four and six times that of the first combination are realized.

The operation of the encoder is further illustrated by the timing diagrams of FIG. 5 and FIG. 6. In FIG. 5, the transmit time duration of a single encoded block is shown for each of the encoding combinations shown in FIG. 4. The QPSK encoded block (501) has a duration equal to the full NTU. Alternately, the 16 QAM encoded block (502), the 64 QAM encoded block (503), and the 256 QAM encoded block (504) have durations of ½, ¼, and ⅙ of the full NTU respectively.

FIG. 6 illustrates NTUs formatted using each of the encoding combinations shown in FIG. 4. The first NTU (601) is comprised of a single QPSK eneoded block (610). The second NTU (602) is comprised of two 16 QAM encoded blocks (620). The third NTU (603) is comprised of four 64 QAM encoded blocks (630). Finally, the fourth NTU (604) is comprised of six 256 QAM encoded blocks (640). Each of the NTUs (601–604) have a common duration such that each occupies a single channel time slot.

Figure 3:
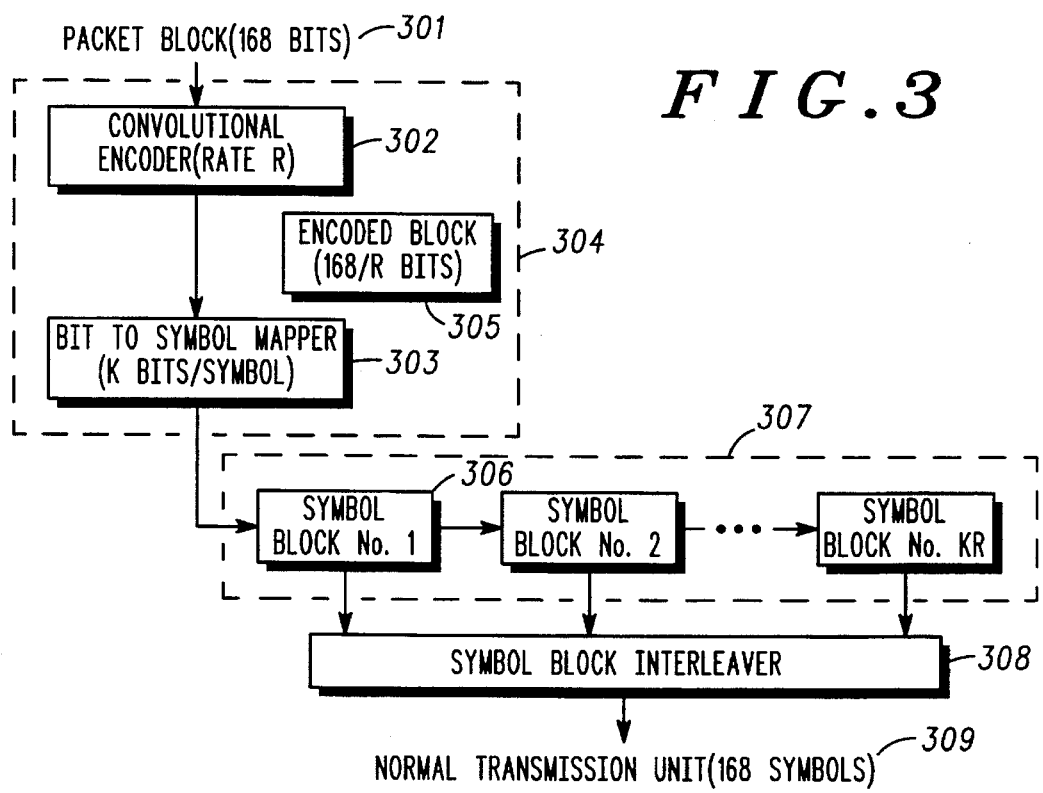
FIG. 3 is a block diagram of a general Forward Error Correction (FEC) and formatting procedure in accordance with the present invention.

In an alternate embodiment, the bit-to-symbol mapper (303) of FIG. 3 may take groups of K/2 encoded bits and produce scalar values. The output of the trellis encoder (304) is a scalar block (306) containing 336/KR scalar values. The scalar block is inserted into the scalar block buffer (307) of length KR blocks. After KR scalar blocks are collected in the buffer, the symbol block interleaver (308) combines the blocks, while simultaneously combining pairs of scalar values to form complex symbols, to form a single NTU (309) of 168 symbols. This NTU (309) is output to a RF modulation process for transmission according to principles well-known in the art.

Note that packets are always encoded into an integer number of NTUs. Thus, channel capacity is never wasted within a string of blocks transmitted at any of the available data rates.

It is intended that the different data rate options described here be used to optimize the net rate of user throughput which will vary according to the RF channel characteristics.

It is well understood in the art that as the signal quality is improved, data communications at higher data rates, with correspondingly higher throughput, are feasible. The determination of the RF channel signal quality is not the subject of this invention. There exist many well known means of signal quality estimation, such as Received Signal Strength Indicators (RSSI), Bit Error Rate (BER) measures and the like, any of which could be used effectively with the present invention.

A typical packet communication would begin with the data unit, either base or mobile, selecting an initial or default modulation technique for its first transmission. The default selection may be based on a predetermined computation of which technique would have the highest probability of use. Alternately, the default selection may be based on the initial value of one or more of channel quality estimation measures. Subsequent transmissions would then take advantage of one or more of the available signal quality estimation measures to update the data rate selection.

Alternately, the modulation technique may be chosen as a function of the quantity of user data to be transmitted. Specifically, a lower rate modulation technique would be chosen if the time required to send the data at the lower rate was the same as the time required to send the data at the higher rate. To illustrate this, consider an example where the signal quality is determined to be sufficient to use the 256 QAM modulation technique. If the data packet to be transmitted is 9–12 blocks in length, it would require 2 slots to transmit at 256 QAM whereas it would require 3 slots using the 64 QAM modulation technique. In general, 256 QAM is chosen for packets longer than 8 blocks since the transmit time will always be less than that of a slower modulation technique. However, for a packet that is 7 or 8 blocks long, the transmit time will be 2 slots for either modulation. In this case, 64 QAM is used since the effective throughput is the same while the reliability of the data transmission is improved. Similar relationships exist for each of the modulation techniques such that the higher rate technique is chosen for packets longer than a threshold value and a lower rate may be chosen for packets of shorter duration.

In yet another embodiment, the modulation selection may be a function of the destination, or intended recipient, of the data packet. For example, if the packet is intended for a single recipient, the modulation technique may be chosen as described above. However, if the packet is intended for more than one recipient, the preferred modulation technique may be one well suited to provide acceptable throughput to the recipient experiencing the worst signal quality as compared to the other recipients. Thus, a modulation technique with a lower effective data rate would typically be chosen for data transmitted to a plurality of recipients. Alternately, a lower rate technique (with correspondingly higher transmission reliability) may be chosen for particularly important recipients or particularly critical data.

The data transmission operation of the present invention will now be described with reference to the flow chart (700) depicted in FIG. 7. The process begins with a quantity of information bits provided to be transmitted to at least one intended recipient (701). In step 702, one of a plurality of modulation techniques, wherein each of the modulation techniques has a corresponding effective data transmission rate, is selected. The information bits are then formatted into blocks (703) such that each block contains 165 bits of information. The blocks are then transmitted in at least one of the channel time slots using the selected modulation technique (704). Note that, regardless of the choice of modulation technique, the formatted blocks are transmitted at a constant symbol rate on the RF channel.

In a system of the present invention, it is important for the receiver of a data packet to know the modulation technique that was used by the transmitter so that proper decoding of the transmitted data can be effected. In the inbound direction, prior to sending each data packet, a mobile unit may transmit a short preamble that includes an indication of the data rate that has been selected for the transmission of its packet. This short preamble is always transmitted using a known predetermined modulation technique so that the base unit can decode its contents and use the information contained therein for properly decoding the following data packet. Thus, each mobile unit may independently select a data rate for each packet.

The series of packets transmitted on the outbound channel is typically completely independent of the inbound packets. The modulation technique in use on the outbound channel is signaled by an additional data field, referred to as the Slot Descriptor Block (SDB), included in each time slot. As in the case of the inbound packet preamble, the SDB is transmitted using a known predetermined modulation technique. Thus, a receiving unit first decodes the SDB to determine how to decode the remainder of the slot, independent of any traffic on the inbound side of the same channel. Similarly to the inbound, the data rate outbound may be varied on a packet-by-packet basis. However, since each outbound slot has a SDB associated with it, the data rate may also be changed on a slot-by-slot basis if desired.

Thus, the invention as described provides a combination of multiple Forward Error Correction (FEC) coding rates and multiple modulation constellations which are used to effect multiple channel data rates. Multiple data rates provide multiple levels of throughput while maintaining an efficient use of the TDM slot resource. The constant symbol rate of the channel is unchanged, only the information content of each symbol is altered. Further, means are provided for each data unit, mobile and fixed, to independently choose the preferred data rate in response to several factors, among them packet length and data recipient.

What is claimed is:

1. A method comprising the steps of:
   providing a communication channel having a plurality of time slots, wherein each of the plurality of time slots has a common duration;
   providing a quantity of information bits to be transmitted to at least one intended recipient;
   providing a plurality of modulation techniques having corresponding effective data transmission rates;
   selecting one of the plurality of modulation techniques to produce a selected modulation technique;
   regardless of which of the plurality of modulation techniques was selected:
      formatting the information bits into at least one block, such that an identical number of information bits are always contained within a single block;
      transmitting the at least one block in at least one of the time slots at a predetermined constant symbol rate using the selected modulation technique.

2. The method of claim 1, wherein the step of transmitting the at least one block in at least one of the time slots includes the step of transmitting the at least one block such that all of the time slots will only contain an integer number of the blocks.

3. The method of claim 1, wherein the step of providing a communication channel includes the step of providing a communication channel that is one of a plurality of communication channels, wherein the plurality of communication channels are offset from adjacent communication channels by 25 kHz.

4. The method of claim 3, wherein the step of providing a communication channel having a plurality of time slots includes the step of providing a communication channel having a plurality of time slots, wherein each time slot has a duration of 15 milliseconds.

5. The method of claim 1, wherein the step of providing a plurality of modulation techniques includes the step of providing a plurality of modulation techniques, wherein one of the plurality of modulation techniques comprises a 64 quadrature amplitude modulation technique.

6. The method of claim 5, wherein the step of providing a plurality of modulation techniques includes the step of providing a plurality of modulation techniques, wherein one of the plurality of modulation techniques comprises a 16 quadrature amplitude modulation technique.

7. The method of claim 6, wherein the step of providing a plurality of modulation techniques includes the step of providing a plurality of modulation techniques, wherein:
   one of the plurality of modulation techniques comprises a 256 quadrature amplitude modulation technique; and
   one of the plurality of modulation techniques comprises a quadrature phase shift keying modulation technique.

8. The method of claim 1, wherein the step of selecting one of the plurality of modulation techniques includes the step of selecting a predetermined one of the plurality of modulation techniques as an initial default selection.

9. The method of claim 1, wherein the step of selecting one of the plurality of modulation techniques includes the step of selecting one of the plurality of modulation techniques at least as a function of the quantity of information bits.

10. The method of claim 9, wherein the step of selecting one of the plurality of modulation techniques at least as a function of the quantity of information bits includes the step of using a first modulation technique when the quantity of information bits are greater in number than a predetermined quantity.

11. The method of claim 10, wherein the step of selecting one of the plurality of modulation techniques at least as a function of the quantity of information bits includes the step of using a second modulation technique when the quantity of information bits are lesser in number than a predetermined quantity, wherein the second modulation technique has a lower effective data rate than the first modulation technique.

12. The method of claim 1, wherein the step of selecting one of the plurality of modulation techniques includes the step of selecting one of the plurality of modulation techniques as a function of the at least one intended recipient.

13. The method of claim 12, wherein the step of selecting one of the plurality of modulation .techniques as a function of the at least one intended recipient includes the step of selecting a first modulation technique when there is only one intended recipient.

14. The method of claim 13, wherein the step of selecting one of the plurality of modulation techniques as a function of the at least one intended recipient includes the step of selecting a second modulation technique when there is more than one intended recipient, where the second modulation technique has a lower effective data rate than the first modulation technique.

15. The method of claim 1, wherein the step of formatting the information bits into at least one block includes the step of formatting the information bits into at least one block, wherein the information bits include both user data and cyclic redundancy check error detection coding.

16. The method of claim 1, wherein the step of formatting the information bits into at least one block includes the step of formatting the information bits into at least one block, wherein the information bits include both user data and error detection coding.

17. The method of claim 16, wherein the step of formatting the information bits into at least one block, such that an identical number of information bits are always contained within a single block includes the step of formatting the information bits into at least one block, such that 165 information bits are always contained within a single block.

18. The method of claim 17, wherein the step of providing a plurality of modulation techniques includes the step of providing a plurality of modulation techniques, wherein one of the plurality of modulation techniques comprises a 64 quadrature amplitude modulation technique, wherein:

the 64 quadrature amplitude modulation technique includes an effective trellis coding rate $\frac{2}{3}$rds;

the 64 quadrature amplitude modulation technique includes error correction coding; and the 64 quadrature amplitude modulation technique has an effective 4 to 1 information-bit-to-transmitted-symbol ratio.

19. The method of claim 18, wherein the step of providing a plurality of modulation techniques includes the step of providing a plurality of modulation techniques, wherein one of the plurality of modulation techniques comprises a 16 quadrature amplitude modulation technique, wherein:

the 16 quadrature amplitude modulation technique includes an effective trellis coding rate $\frac{1}{2}$;

the 16 quadrature amplitude modulation technique includes error correction coding; and the 16 quadrature amplitude modulation technique has an effective 2 to 1 information-bit-to-transmitted-symbol ratio.

20. The method of claim 19, wherein the step of providing a plurality of modulation techniques includes the step of providing a plurality of modulation techniques, wherein the plurality of modulation techniques further comprise:

a 256 quadrature amplitude modulation technique, wherein:

the 256 quadrature amplitude modulation technique includes an effective trellis coding rate $\frac{3}{4}$ths;

the 256 quadrature amplitude modulation technique includes error correction coding; and the 256 quadrature amplitude modulation technique has an effective 6 to 1 information-bit-to-transmitted-symbol ratio;

a quadrature phase shift keyed modulation technique, wherein:

the quadrature phase shift keyed modulation technique includes an effective trellis coding rate $\frac{1}{2}$;

the quadrature phase shift keyed modulation technique includes error correction coding; and the quadrature phase shift keyed modulation technique has an effective 1 to 1 information-bit-to-transmitted-symbol ratio.

21. A method for transmitting user data through a wireless communication medium using at least one of a plurality of modulation techniques having corresponding effective data transmission rates, comprising the steps of:

providing a communication channel having a plurality of time slots, wherein each of the plurality of time slots has a 15 millisecond duration;

providing a quantity of information bits to be transmitted to at least one intended recipient, wherein the information bits include both user data and error detection coding bits;

providing a plurality of modulation techniques, wherein one of the plurality of modulation techniques comprises a 64 quadrature amplitude modulation technique, wherein:

the 64 quadrature amplitude modulation technique includes an effective trellis coding rate $\frac{2}{3}$rds;

the 64 quadrature amplitude modulation technique includes error correction coding; and the 64 quadrature amplitude modulation technique has an effective 4 to 1 information-bit-to-transmitted-symbol ratio;

selecting one of the plurality of modulation techniques to produce a selected modulation technique;

regardless of which of the plurality of modulation techniques was selected:

formatting the information bits into at least one block, such that an identical number of information bits are always contained within a single block;

transmitting the at least one block in at least one of the time slots at a predetermined constant symbol rate using the selected modulation technique.

22. The method of claim 21, wherein the step of providing a plurality of modulation techniques includes the step of providing a plurality of modulation techniques, wherein one of the plurality of modulation techniques comprises a 16 quadrature amplitude modulation technique, wherein:

the 16 quadrature amplitude modulation technique includes an effective trellis coding rate $\frac{1}{2}$;

the 16 quadrature amplitude modulation technique includes error correction coding; and the 16 quadrature amplitude modulation technique has an effective 2 to 1 information-bit-to-transmitted symbol ratio.

23. The method of claim 22, wherein the step of providing a plurality of modulation techniques includes the step of providing a plurality of modulation techniques, wherein the plurality of modulation techniques further comprise:

a 256 quadrature amplitude modulation technique, wherein:

the 256 quadrature amplitude modulation technique includes an effective trellis coding rate $\frac{3}{4}$ths;

the 256 quadrature amplitude modulation technique includes error correction coding; and the 256 quadrature amplitude modulation technique has an effective 6 to 1 information-bit-to-transmitted-symbol ratio;

a quadrature phase shift keyed modulation technique, wherein:

the quadrature phase shift keyed modulation technique includes an effective trellis coding rate $\frac{1}{2}$;

the quadrature phase shift keyed modulation technique includes error correction coding; and the quadrature phase shift keyed modulation technique has an effective 1 to 1 information-bit-to-transmitted-symbol ratio.

* * * * *